(12) United States Patent
Becker (10) Patent No.: US 8,090,040 B2
(45) Date of Patent: Jan. 3, 2012

(54) METHOD AND SYSTEM TO MAINTAIN SHAPES OF TEMPORAL PULSES IN WIRELESS BROADBAND SIGNALS TRANSMITTED THROUGH A DISPERSIVE ANTENNA

(75) Inventor: Robert C. Becker, Eden Prairie, MN (US)

(73) Assignee: Honeywell International Inc., Morristown, NJ (US)

( * ) Notice: Subject to any disclaimer, the term of this patent is extended or adjusted under 35 U.S.C. 154(b) by 1523 days.

(21) Appl. No.: 11/260,336

(22) Filed: Oct. 27, 2005

(65) Prior Publication Data
US 2007/0098104 A1    May 3, 2007

(51) Int. Cl.
*H04B 7/02*    (2006.01)
(52) U.S. Cl. ....................................................... 375/267

(58) Field of Classification Search .................. 375/130, 375/133, 135, 136, 141, 146, 147, 267, 299, 375/347; 342/82, 89; 455/500, 503, 101
See application file for complete search history.

(56) References Cited

U.S. PATENT DOCUMENTS

| | | | | |
|---|---|---|---|---|
| 3,618,095 A * | 11/1971 | Darlington | .................... | 342/201 |
| 4,151,524 A * | 4/1979 | Caputi, Jr. | ........................ | 342/50 |
| 5,467,213 A * | 11/1995 | Kaede et al. | .................. | 398/155 |
| 6,940,893 B1 * | 9/2005 | Pinkney et al. | ............... | 375/139 |
| 2005/0164695 A1 * | 7/2005 | Kamdar et al. | ............... | 455/420 |
| 2007/0025739 A1 * | 2/2007 | Moore et al. | .................. | 398/202 |

* cited by examiner

*Primary Examiner* — Young T. Tse
(74) *Attorney, Agent, or Firm* — Fogg & Powers LLC (57) ABSTRACT

A radio frequency system for broadband wireless communication including one or more dispersive antennae operable to transmit and receive wireless broadband signals having a wide range of frequencies and one or more equalizers each in communication with a respective dispersive antenna and each operable to distort the broadband signals to reduce the dispersive effects of the respective antenna.

17 Claims, 6 Drawing Sheets

METHOD AND SYSTEM TO MAINTAIN SHAPES OF TEMPORAL PULSES IN WIRELESS BROADBAND SIGNALS TRANSMITTED THROUGH A DISPERSIVE ANTENNA

TECHNICAL FIELD

The present invention relates generally to maintaining the shape of temporal pulses and in particular to maintaining the shape of temporal pulses transmitted through a dispersive antenna in a wireless communication system.

BACKGROUND

In an ultrawideband (UWB) wireless communication system, the shape of the temporal pulse is important to correct system operation. The shape of the temporal pulse is only maintained if the transmitting and receiving antennae have flat, non-dispersive frequency responses. Electrically long antennae, such as dipole antennae, that are one-half or one-quarter of the radiated resonant signal wavelength $\lambda$ are efficient but they have dispersive frequency response. For a typical electrically long antenna, the antenna performance uniformity begins to drop off for frequencies more than about 20% removed from the center resonant frequency. Thus, the temporal pulses in the pulse train of the broadband signal are distorted in shape by the dispersion in the electrically long antenna. The pulse distortion of an electrically long antennae smears the pulse shape beyond recognition at the UWB wireless communication system receiver. Therefore, non-dispersive electrically short antennae are used in UWB wireless communication systems.

Unfortunately, the electrically short antennae, which are about one-tenth of the wavelength of the radiated resonant signal, are inefficient radiators of radio frequency energy and are also poor receiving antennae. The maximum range of currently available electrically short antennae can be less than a few miles compared to a maximum range of as much as 30 miles for currently available electrically long antennae. The UWB systems increase the output power of the transmitters to offset the inefficiency of the electrically short antennae.

The increased output power required for the electrically short antenna in UWB system is a drawback for military applications, which require portability and the ability to conceal the system from the enemy. The higher output power required by the electrically short antennae makes the UWB system too power hungry for many portable battery operated applications and the high output power is more easily detected by enemy in the region.

For the reasons stated above and for other reasons stated below which will become apparent to those skilled in the art upon reading and understanding the specification, there is a need in the art for UWB wireless communication systems to overcome the dispersion of the efficient electrically long antennae so they can be used in portable UWB wireless applications.

SUMMARY

The embodiments of the present invention provide methods and systems for using equalizers in a broadband wireless communication system to reduce the dispersive effects of dispersive antennae and will be understood by reading and studying the following specification.

One aspect of the present invention provides a radio frequency system for broadband wireless communication including one or more dispersive antennae operable to transmit and receive wireless broadband signals having a wide range of frequencies and one or more equalizers each in communication with a respective dispersive antenna and each operable to distort the broadband signals to reduce the dispersive effects of the respective antenna.

Another aspect of the present invention provides a method to maintain shapes of temporal pulses in wireless broadband signals transmitted through a dispersive antenna. The method includes generating a broadband signal having temporal pulses, modifying the broadband signal to compensate for distortion due to a dispersive antenna, transmitting a modified broadband signal to the dispersive antenna and wirelessly radiating the broadband signal from the dispersive antenna, wherein the shapes of the radiated temporal pulses are similar to the shapes of the generated temporal pulses.

Another aspect of the present invention provides a system to improve the efficiency and receiver sensitivity of electrically long antennae in an ultrawideband wireless communication. The system includes means to generate a broadband signal having shaped temporal pulses, means to distort the broadband signal before wireless transmission and means to wirelessly transmit the broadband signal having the shaped temporal pulses from a dispersive transmitter antenna.

DRAWINGS

Embodiments of the present invention can be more easily understood and further advantages and uses thereof more readily apparent, when considered in view of the description of the preferred embodiments and the following figures in which.

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Figure 1:
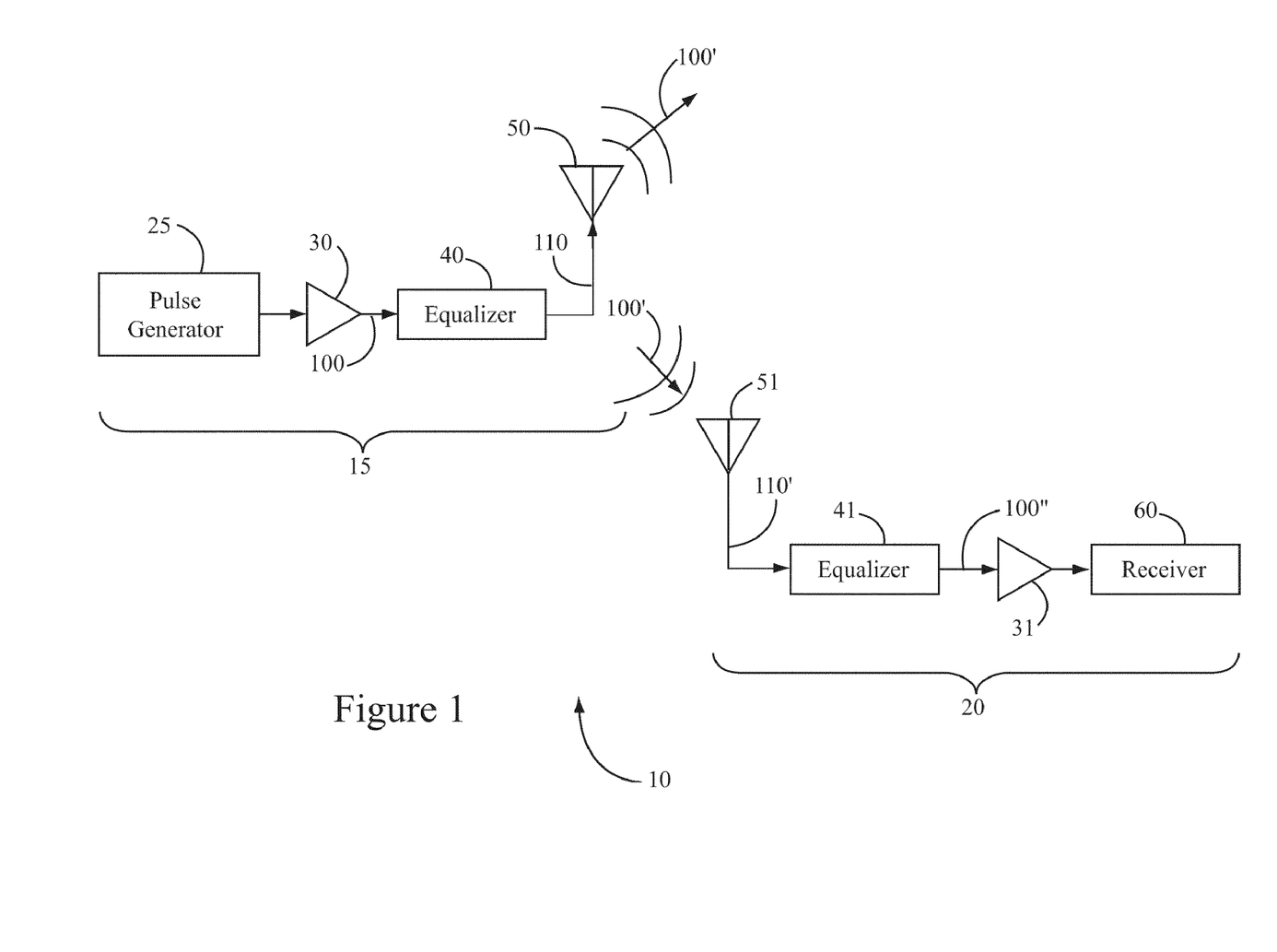
FIG. 1 is a first embodiment of a broadband wireless communication system in accordance with the present invention.

FIG. 1 is a first embodiment of a broadband wireless communication system 10 in accordance with the present invention. The broadband wireless communication system 10 includes a wireless transmitter 15 and a wireless receiver 20. The wireless transmitter 15 includes a broadband transmitter pulse generator 25, a power amplifier 30, an equalizer 40 and a dispersive antenna 50.

The broadband transmitter pulse generator 25 outputs an undistorted broadband signal 100 through the power amplifier 30 to the equalizer 40. The broadband signal 100 is an ultrawideband signal having shaped temporal pulses. The undistorted broadband signal 100 is a series of pulses in time having a shape that is a function of the spectrum of frequencies that make up the broadband signal. As defined herein, a broadband signal is an undistorted broadband signal 100 if the shapes of the temporal pulses that form the broadband signal are undistorted.

The equalizer 40 distorts the undistorted broadband signal 100 by an inverse of the distortion that arises from the dispersive antenna 50. The equalizer 40 outputs the distorted broadband signal 110 to the dispersive antenna 50. As defined herein, a broadband signal is a distorted broadband signal 110 if the shapes of the temporal pulses that form the broadband signal are distorted by an inverse of the distortion caused by a dispersive antenna in communication with the equalizer 40. The dispersive antenna 50 receives the distorted broadband signal 110 at an input. The dispersive antenna 50 radiates the undistorted broadband signal 100 after the distorted broadband signal 110 is distorted by the dispersive antenna 50.

The equalizer 40 modifies the broadband signal 100 to compensate for distortion caused by the dispersive antenna 50 by distorting the shape of the temporal pulses of the wireless broadband signal by an inverse of the transmitting distortion due to the dispersive antenna 50, which is a dispersive transmitting antenna. By twice distorting the broadband wireless signal 100, first with an inverse distortion and then with a distortion, the pulses in the broadband wireless signal 100 are returned to their original pulse shape. Thus, the radiated broadband signal 100' is shaped as temporal pulses that are about the same as the shapes of the temporal pulses generated by the broadband transmitter pulse generator 25.

In this manner the wireless transmitter 15 has generated broadband signal 100 having shaped temporal pulses, then distorted the broadband signal before transmission and subsequently transmitted the broadband signal 100' having the initial shaped temporal pulses from a dispersive transmitter antenna 50. The undistorted broadband signal 100' radiated from dispersive antenna 50 is essentially the same as the undistorted broadband signal 100 generated at the broadband transmitter pulse generator 25. Since the shape of the temporal pulses is critical to the efficiency of the broadband wireless communication system 10, it is important that the wireless transmitter 15 transmit an undistorted broadband signal 100'.

The transmission of the signals among the broadband transmitter pulse generator 25, the power-amplifier 30, the equalizer 40 and the dispersive antenna 50 is provided by electronic circuits including conductive trace lines within the wireless transmitter 15. In one embodiment, the transmission of the signals among the broadband transmitter pulse generator 25 and the power-amplifier 30 is provided by optical communication technologies within the wireless transmitter 15. Optical communication technologies are known in the art.

In yet another embodiment, the dispersive antenna 50 is an electrically long antenna. In yet another embodiment, the wide range of frequencies in the broadband signals includes frequencies from about 100 MHz to about 1000 MHz for wireless transmitter 15 having a center frequency of about 500 MHz. In yet another embodiment, there is no power amplifier 30 in the wireless transmitter 15 as pulse generator 25 alone develops sufficient output power to satisfy the requirements for communications over a particular distance.

The wireless receiver 20 includes a dispersive antenna 51, an equalizer 41, a pre-amplifier 31 and a broadband receiver 60. The dispersive antenna 51 receives the undistorted broadband signal 100' radiated from dispersive antenna 50 in the wireless transmitter 15. The undistorted broadband signal 100' is distorted by the distortion due to the dispersive antenna 51, and transmitted as distorted broadband signal 110' to the equalizer 41. The equalizer 41 distorts the distorted broadband signal 110' by an inverse of the dispersion in the dispersive antenna 51. The equalizer 40 outputs the undistorted broadband signal 100 through the pre-amplifier 31 to the broadband receiver 60.

The equalizer 41 modifies the broadband signal 110' to compensate for distortion caused by the dispersive antenna 51 by distorting the shape of the temporal pulses of the wireless broadband signal 110' by an inverse of the transmitting distortion of the dispersive antenna 51, which is a dispersive transmitting antenna. By twice distorting the broadband wireless signal 100', first with a distortion and then with an inverse distortion, the pulses in the broadband wireless signal 100' are returned to their original pulse shape. Thus, the radiated broadband signal 100' is shaped as temporal pulses that are about the same as the shapes of the temporal pulses generated by the broadband transmitter pulse generator 25.

The broadband receiver 60 receives the undistorted broadband signal 100" from the pre-amplifier 31. Since the received signal 100" includes a train of temporal pulses that have a shape that is essentially the same as the train of temporal pulses that were emitted from the pulse generator 25 in the wireless transmitter 15, the wireless receiver 20 is able to efficiently recognize the signal 100" with minimal systematic errors. Additionally, the wireless receiver 60 does not require the increased receiver sensitivity needed for broadband wireless communication systems that include electrically short antenna in order to efficiently recognize the signal 100 with out without excessive systematic errors.

In this manner, the broadband wireless communication system 10, which includes two dispersive antennae, is able to efficiently transmit and receive broadband signals without providing the relatively high level of output power required for a broadband wireless communication system that includes two electrically short antennae. In one embodiment, the dispersive antenna 51 is an electrically long antenna.

The transmission of the signals among the dispersive antenna 51, the equalizer 41, the pre-amplifier 31 and the broadband receiver 60 is provided by electronic circuits including conductive trace lines within the wireless receiver 20. In one another embodiment, the transmission of the signals among the equalizer 41 and the pre-amplifier 31 is provided by optical communication technologies within the wireless receiver 20. In one embodiment, the dispersion in the dispersive antenna 50 and the dispersive antenna 51 are the same and consequently equalizer 40 is the same as equalizer 41.

Figure 2A:
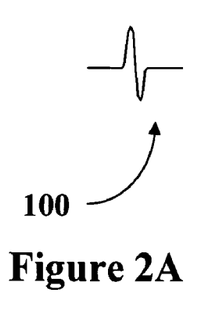
FIGS. 2A-2D are exemplary shapes of temporal pulses in the broadband wireless communication system of FIG. 1.
Figure 2B:
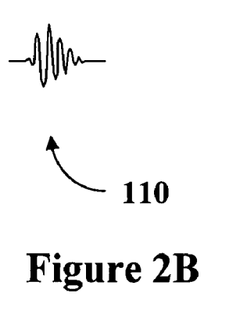

FIGS. 2A-2D are exemplary shapes 100-130 of temporal pulses in the broadband wireless communication system 10 of FIG. 1. FIG. 2A shows an exemplary shape of temporal pulses that form an exemplary first undistorted broadband signal 100 generated by the broadband transmitter pulse generator 25. FIG. 2B shows the first distorted broadband signal 110 which is the shape of the first undistorted broadband signal 100 as shown in FIG. 2A after it is distorted by the inverse of the dispersion of an exemplary dispersive antenna.

Figure 2C:
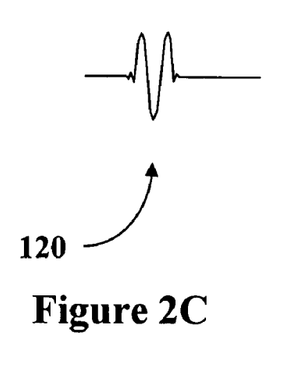
Figure 2D:
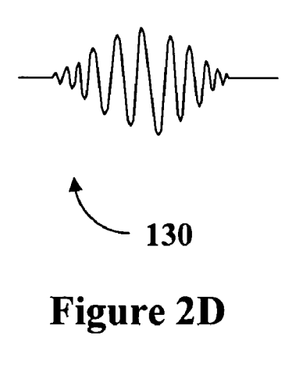

FIG. 2C shows an exemplary shape of temporal pulses that form a second exemplary undistorted broadband signal 120 generated by the broadband transmitter pulse generator 25. FIG. 2D shows the second distorted broadband signal 130 which is the shape of the second undistorted broadband signal 120 as shown in FIG. 2C after it is distorted by the inverse of the dispersion of an exemplary dispersive antenna. The undistorted broadband signal 120 and the distorted broadband signal 130 are shown in transmission with the undistorted broadband signal 100 and the distorted broadband signal 110 through the transceiver 12 as described below with reference to FIG. 5. Likewise, the undistorted broadband signal 120 and the distorted broadband signal 130 are shown in transmission with the undistorted broadband signal 100 and the distorted broadband signal 110 through the broadband wireless communication system 14 as described below with reference to FIG. 6.

Figure 3:
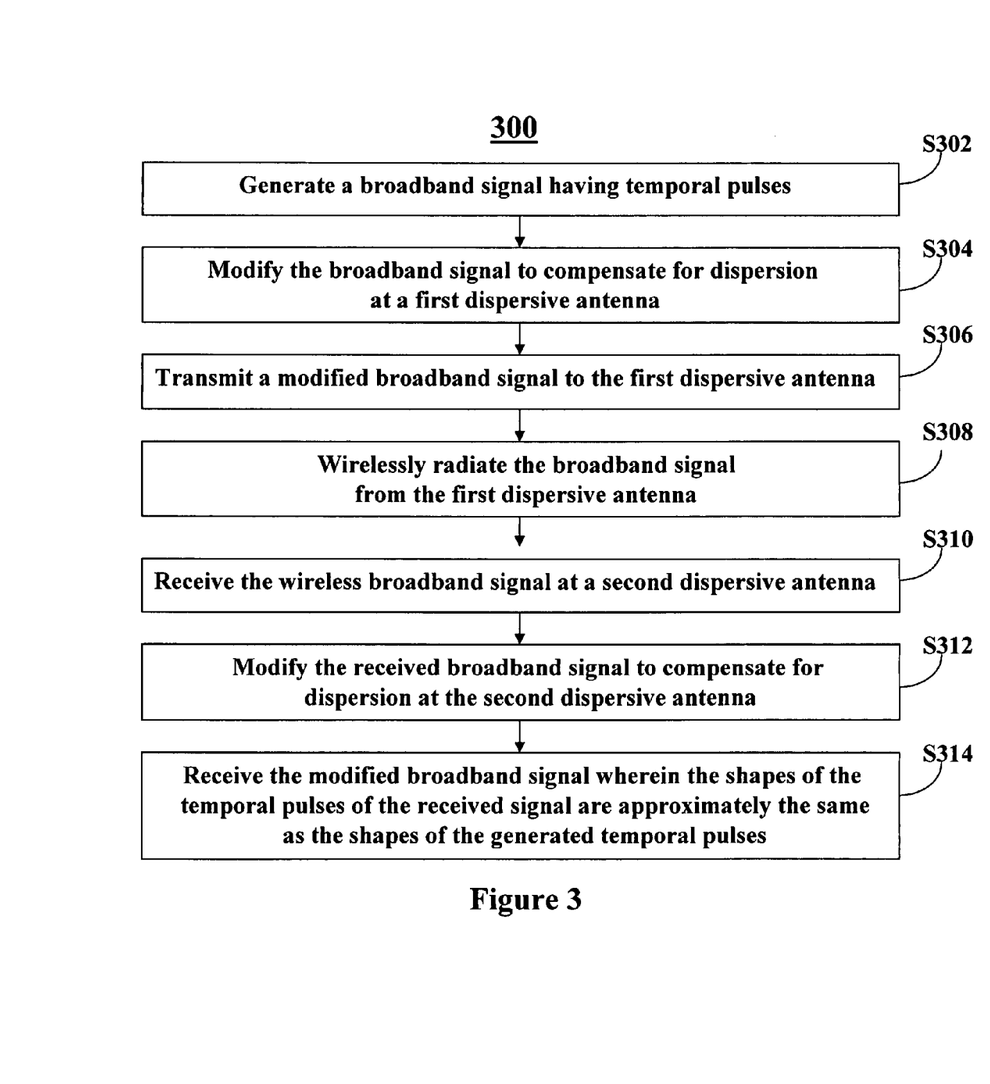
FIG. 3 is an embodiment of a method to maintain shapes of temporal pulses in broadband signals transmitted through two dispersive antennae of the broadband wireless communication system of FIG. 1.

FIG. 3 is an embodiment of a method 300 to maintain shapes of temporal pulses in broadband signals 100 transmitted through two dispersive antennae 50 and 51 of the broadband wireless communication system 10 of FIG. 1. The method 300 is described with reference to the broadband wireless communication system 10 of FIG. 1. The dispersive antenna 50, dispersive antenna 51 and equalizers 40-41 include hardware and computer readable medium storing a computer program operable to perform the functions described with reference to method 300.

During stage S302, the broadband wireless communication system 10 generates a broadband signal 100 having temporal pulses as shown in FIG. 2A. The broadband transmitter pulse generator 25 generates the broadband signal 100 and transmits it to the power amplifier 30, where the broadband signal 100 is amplified as necessary for the broadband wireless communication system 10. The broadband signal 100 is output from the power amplifier 30 into the equalizer. 40.

During stage S304, the broadband wireless communication system 10 modifies the broadband signal 100 to compensate for dispersion at the first dispersive antenna 50. The modification occurs when the equalizer 40 applies an algorithm that inverts the broadband signal 100 to form the distorted broadband signal 110. During stage S306, the broadband wireless communication system 10 transmits the modified distorted broadband signal 110 to the first dispersive antenna 50. The equalizer 40 outputs the distorted broadband signal 110 to the dispersive antenna 50.

During stage S308, the dispersive antenna 50 in the broadband wireless communication system 10 wirelessly radiates the broadband signal 100'. The shapes of the radiated temporal pulses that comprise the broadband signal 100' are similar to the shapes of the generated temporal pulses since the original signal is obtained by inverting an inverted signal. The distortion caused by the dispersive antenna effectively inverts the distortion introduced by equalizer 40 resulting in an undistorted signal.

A second dispersive antenna 51 is within the range of the first dispersive antenna 50 in the broadband wireless communication system 10. During stage S310, the second dispersive antenna 51 in the broadband wireless communication system 10 receives the wireless broadband signal 100' that was transmitted from the first dispersive antenna 50 during stage S308. As the broadband signal 100' is transmitted through the second dispersive antenna 51, the dispersion of the second dispersive antenna 51 distorts the shape of the radiated temporal pulses to form broadband signal 110'110. The second dispersive antenna 51 outputs the broadband signal 100' the equalizer 41.

In this exemplary case, the dispersion of second dispersive antenna 50 is the same as the dispersion in the first dispersive antenna 50, which is why the broadband signal 110, which was generated in the wireless transmitter 15 is also generated as the broadband signal 110' in the wireless receiver 20. In one embodiment, the dispersion in second dispersive antenna 51 is different from the dispersion in the first dispersive antenna 50 and another signal, such as, the signal 130 in FIG. 2D is generated in the wireless receiver 20 during stage S310.

During stage S312, the equalizer 41 modifies the received broadband signal 110' to compensate for the dispersion at the second dispersive antenna 51. As before, since the equalizer 41 associated with the dispersive antenna 51 distorts the broadband signal 110' by the inverse of the dispersion of the dispersive antenna 51, the received broadband signal 100' has been inverted the say way twice and the equalizer 41 associated with the dispersive antenna 51 outputs the broadband signal 100". The broadband signal 100" output from the equalizer 41 is input at the pre-amplifier 31. After the pre-amplifier 31 amplifies the broadband signal 100" as necessary, the amplified signal 100" is output to the broadband receiver 60.

During stage S314, the broadband receiver 60 in the broadband wireless communication system 10 receives the modified broadband signal 100". The shapes of the temporal pulses of the received signal 100" are about the same as the shapes of the generated temporal pulses of the broadband signal 100 generated during stage S302.

Figure 4:
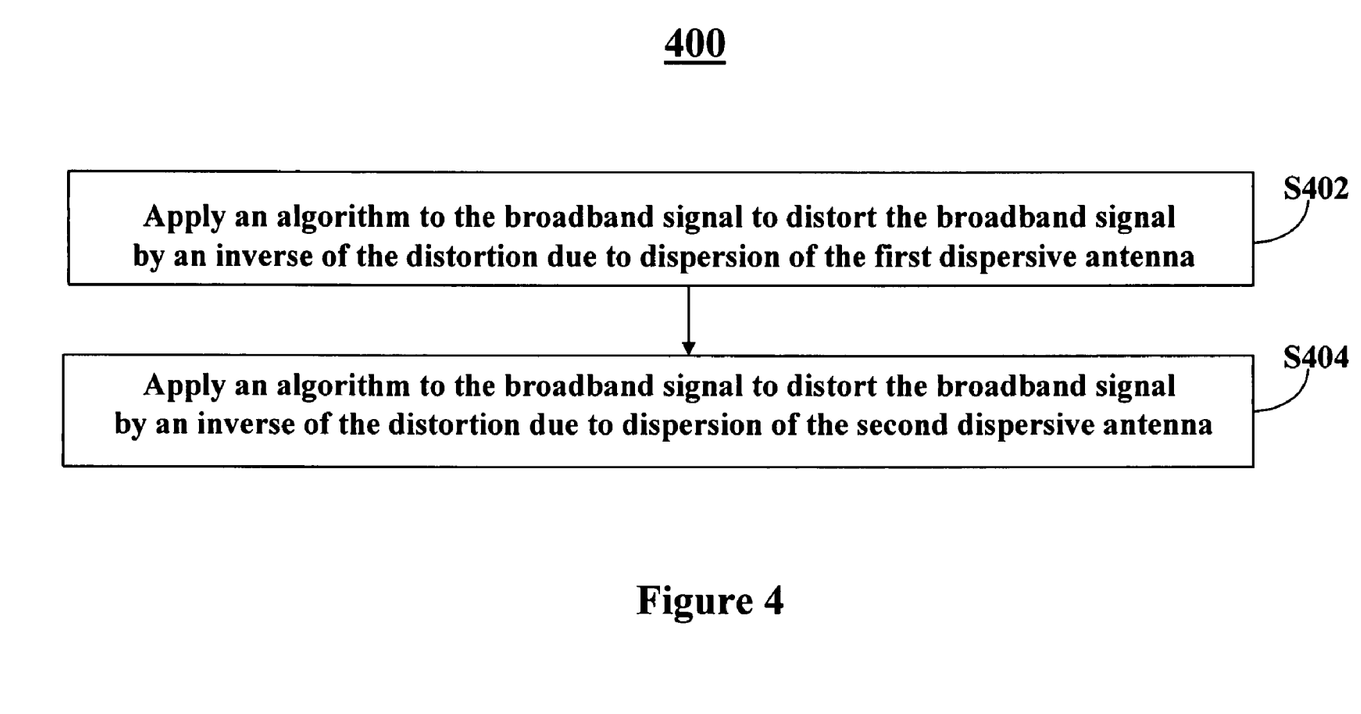
FIG. 4 is an embodiment of a method to modify a broadband signal to compensate for distortion due to a dispersive antenna in accordance with the present invention.

FIG. 4 is an embodiment of a method 400 to modify a broadband signal 100 to compensate for distortion due to dispersive antenna 50 in accordance with the present invention. The method 400 is described with reference to the equalizers 40 and 41 of FIG. 1. The equalizers 40-41 include hardware and computer readable medium storing a computer program operable to perform the functions described with reference to method 400.

During stage S402, the equalizer 40 applies an algorithm to the broadband signal 100 to distort the broadband signal 100 by an inverse of the distortion due to the first dispersive antenna 50. The first dispersive antenna 50 is associated with the equalizer 40. In one embodiment, an equalizer 40 is associated with more than one dispersive antenna 50 and is operable to receive signals from one or more pulse generators 25 and to transmit the distorted broadband signal 110 to the respective first dispersive antenna 50. In this case, information contained within the broadband signal 100 indicates which of the associated first dispersive antennae 50 should receive the distorted broadband signal 110.

During stage S404, the equalizer 41 applies an algorithm to the broadband signal 110' to distort the broadband signal 100' by an inverse of the distortion caused by the second dispersive antenna 51. The second dispersive antenna 51 is associated with the equalizer 41. In one embodiment, an equalizer 41 is associated with more than one dispersive antenna 51 and is operable to receive signals from one or more pulse generators 25 and to transmit the distorted broadband signal 110' to the respective second dispersive antenna 51. In this case, information contained within the broadband signal 100' indicates which of the associated second dispersive antennae 51 should receive the broadband signal 110'.

Figure 5:
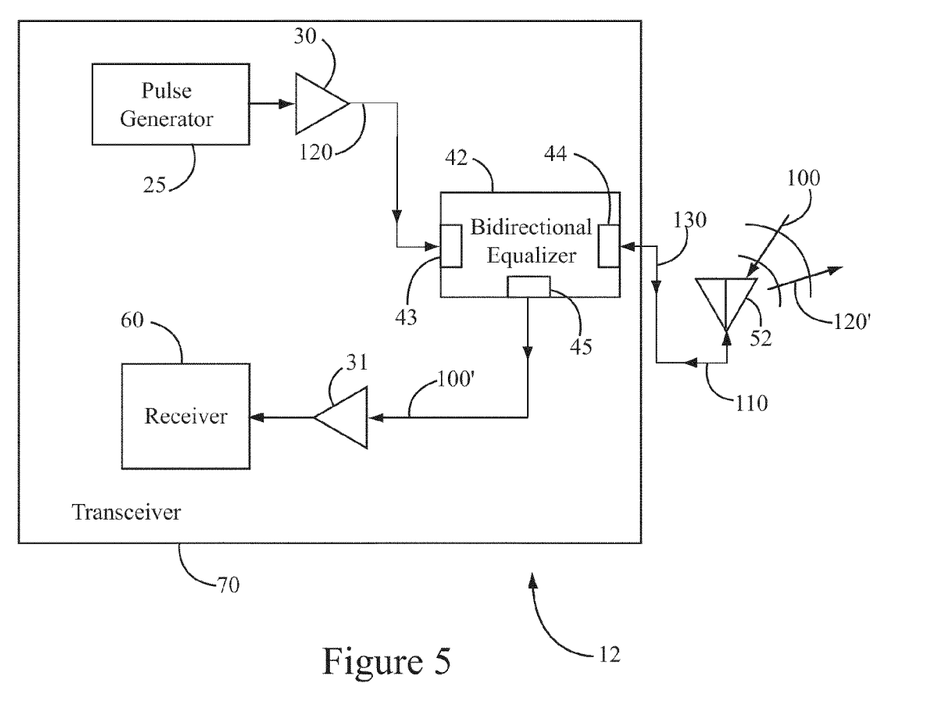
FIG. 5 is an embodiment of a transceiver in accordance with the present invention.

FIG. 5 is an embodiment of a transceiver system 12 in accordance with the present invention. The transceiver system 12 includes a transceiver 70 and a dispersive antenna 52. The dispersive antenna 52 is similar in function to the dispersive antenna 50 described above with reference to FIG. 1. The transceiver 70 includes pulse generator 25, power amplifier 30, pre-amplifier 31, broadband receiver 60 and a bidirectional equalizer 42. The functions of pulse generator 25, power amplifier 30, pre-amplifier 31 were described above. The bidirectional equalizer 42 has a first port 43 and a second port 44, which are operable to receive broadband signals, such as broadband signals 100-130 (FIGS. 2A-2C). The bidirectional equalizer 42 is operable to similarly distort broadband signals 100-130 that are input at either first port 43 or second port 44. The bidirectional equalizer 42 distorts broadband signals 100-130, which are input at either first port 43 or second port 44, by an inverse of the distortion due to an associated dispersive antenna, such as dispersive antenna 50 or 51.

With reference to FIG. 5, the pulse generator 25 generates a broadband signal 120 as shown in FIG. 2C which is input, after amplification by power amplifier 30, into first port 43 of bidirectional equalizer 42. The broadband signal 120 is distorted in the bidirectional equalizer 42 by the inverse of the distortion due to associated dispersive antenna 52. Upon inversion, the broadband signal 120 is transmitted from the bidirectional equalizer 42 at the second port 44 as broadband signal 130 to the dispersive antenna 52. The distortion due to the dispersive antenna 52 distorts the distorted broadband signal 130 which is then radiated as undistorted signal 120'.

At the same time the dispersive antenna 52 receives broadband signal 100 and transmits the distorted broadband signal as broadband signal 110 to a second port 44 of the bidirectional equalizer 42. The broadband signal 110 is distorted in the bidirectional equalizer 42 by the inverse of the distortion due to associated dispersive antenna 52. Bidirectional equalizer 42 outputs the broadband signal 100' from an output port 45. In one embodiment, the output port 45 is the same as first port 43. Broadband signal 100' is amplified at pre-amplifier 31 as necessary and then transmitted to the broadband receiver 60. In this manner, the transceiver system 12 operates to simultaneously send and receive undistorted broadband signals from a dispersive antenna 52. In one embodiment, the dispersive antenna 52 is an electrically long antenna. In another embodiment, the transceiver system 12 does not include one or both of power amplifier 30 and the pre-amplifier 31.

Figure 6:
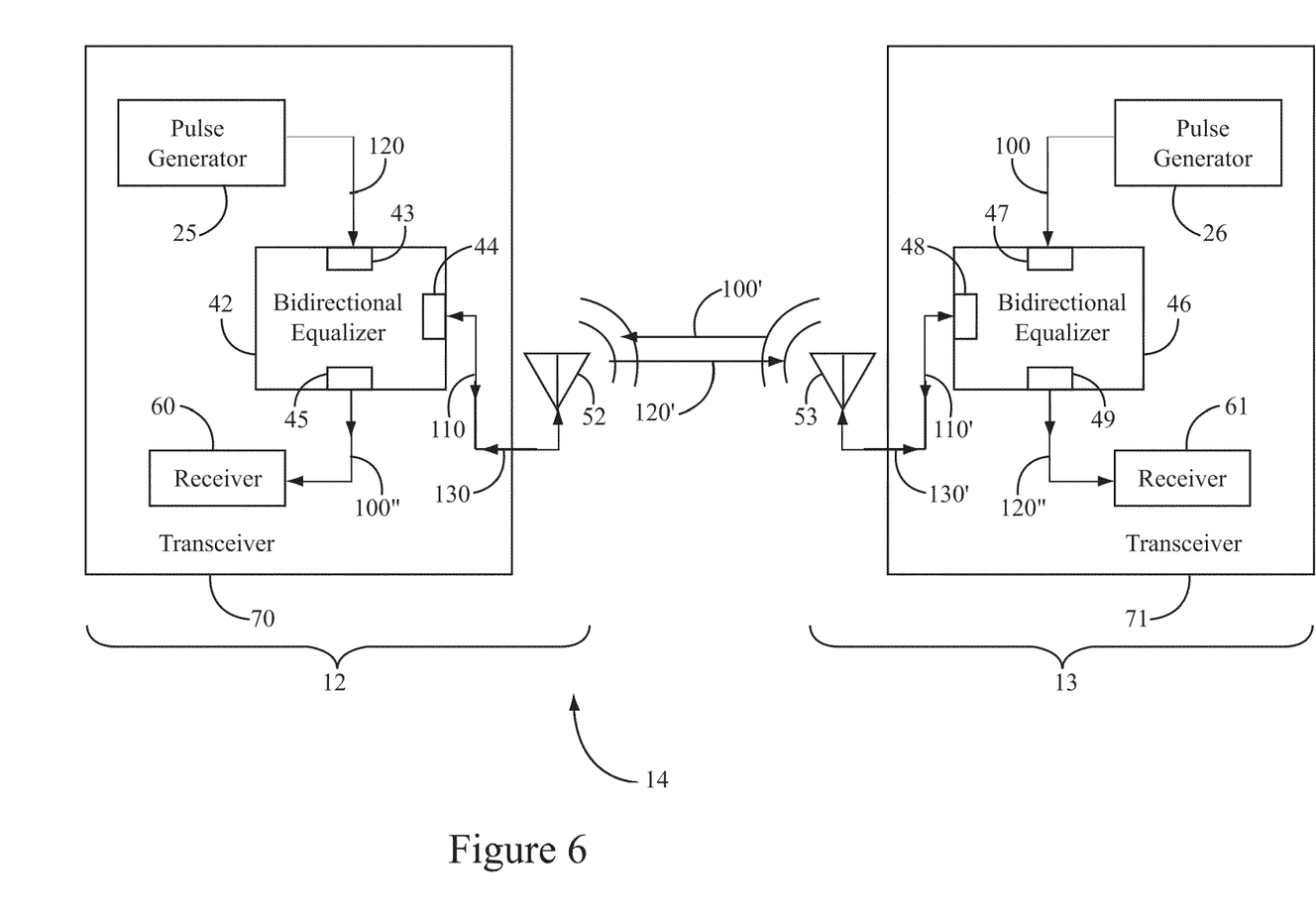
FIG. 6 is a second embodiment of a broadband wireless communication system including two transceivers of FIG. 5 in accordance with the present invention.

FIG. 6 is a second embodiment of a broadband wireless communication system 14 including two transceiver systems 12 and 13 of FIG. 5 in accordance with the present invention. Transceiver system 13 functions in the same manner as transceiver system 12 as described above with reference to FIG. 5. Transceiver system 12 and transceiver system 13 are within radio frequency range of each other and are thus operable to communicate with each other. Undistorted broadband signal 120' is transmitted from transceiver system 12 to transceiver system 13 and undistorted broadband signal 110' is transmitted from transceiver system 13 to transceiver system 12. The pre-amplifiers 30 (FIG. 5) and the amplifiers 31 are not shown within the transceiver systems 12 and 13 in FIG. 6 for clarity of the illustration. Transceiver system 13 includes transceiver 71 and associated dispersive antenna 53.

The transceiver 71 includes pulse generator 26, broadband receiver 61 and a bidirectional equalizer 46. The functions of pulse generator 26 are the same as the functions of pulse generator 25 as described above with reference to FIG. 1. The bidirectional equalizer 46 has a first port 47 and a second port 48 which are operable to receive broadband signals, such as broadband signals 100 and 130'. The bidirectional equalizer 46 is operable to similarly distort broadband signals 100 and 130' that are input at either first port 47 or second port 48. The bidirectional equalizer 46 distorts broadband signals 100 and 130' by an inverse of the distortion due to associated dispersive antenna 53.

The pulse generator 26 generates a broadband signal 100 as shown in FIG. 2A which is input into first port 47 of bidirectional equalizer 46. The broadband signal 100 is distorted in the bidirectional equalizer 46 by the inverse of the distortion due to associated dispersive antenna 53. Upon inversion, the broadband signal 100 is transmitted from the bidirectional equalizer 46 at the second port 48 as broadband signal 110' to the dispersive antenna 53. The distortion caused by the dispersive antenna 53 distorts the distorted broadband signal 110 which is then radiated as undistorted signal 100'.

At the same time the dispersive antenna 53 receives broadband signal 120' and transmits the distorted broadband signal as broadband signal 130' to the second port 48 of the bidirectional equalizer 46. The broadband signal 110' is distorted in the bidirectional equalizer 46 by the inverse of the distortion arising from associated dispersive antenna 53. Bidirectional equalizer 46 outputs the broadband signal 120" from an output port 49. In one embodiment, the output port 49 is the same as first port 47. Broadband signal 120" is transmitted to the broadband receiver 61. In this manner, the transceiver system 13 operates to simultaneously send and receive undistorted broadband signals from a dispersive antenna 53. In one embodiment, the dispersive antenna 53 is an electrically long antenna. In another embodiment, the distortion due to dispersive antenna 53 is the same the distortion due to dispersive antenna 52.

Transceiver system 12 transmits the undistorted broadband signal 120' as described above with reference to FIG. 5. In this manner broadband signals are bi-directionally transmitted in a radio frequency system for broadband wireless communication using electrically long antennae which are capable of a transmitting radio frequency signals farther than electrically short antennae.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A radio frequency communication system for broadband wireless communication, the system comprising:
   dispersive antennae operable to radiate and receive wireless broadband signals having a wide range of frequencies; and
   equalizers each in communication with a respective dispersive antenna and each operable to distort the broadband signals prior to being radiated from the respective dispersive antenna to reduce the dispersive effects of the respective dispersive antenna on the transmission of the broadband signals, each equalizer also being operable to distort the broadband signals after being received at the respective antenna to reduce the dispersive effects of the respective dispersive antenna on the reception of the broadband signals.

2. The system of claim 1, wherein the dispersive antennae include:
   a first dispersive antenna in communication with a first equalizer; and
   a second dispersive antenna in communication with a second equalizer,
   the system further comprising:

a broadband transmitter pulse generator operable to generate a first undistorted broadband signal and send the generated first undistorted broadband signal to the first equalizer, wherein the first equalizer distorts the first undistorted broadband signal by an inverse of the distortion caused by the first dispersive antenna and the first undistorted broadband signal is radiated from the first dispersive antenna, wherein the second dispersive antenna receives the first undistorted broadband signal radiated from the first dispersive antenna and the received undistorted broadband signal is distorted by the distortion due to the second dispersive antenna, and wherein the second equalizer receives a distorted broadband signal from the second dispersive antenna and distorts the received distorted broadband signal by an inverse of the distortion introduced by the second dispersive antenna to form a second undistorted broadband signal; and a broadband receiver operable to receive the second undistorted broadband signal transmitted from the second equalizer.

3. The system of claim 2, wherein a pulse generated by the broadband transmitter pulse generator has a bandwidth greater than 30% of a center frequency of the pulse.

4. The system of claim 1, wherein the equalizers are operable to distort the broadband signals by an inverse of the dispersion of the respective dispersive antenna.

5. The system of claim 1, wherein the equalizers each comprises a bidirectional equalizer having two ports, each bidirectional equalizer operable to substantially similarly distort signals input at either port, wherein each bidirectional equalizer outputs the broadband signals to the respective dispersive antenna and inputs the broadband signals from the respective dispersive antenna.

6. The system of claim 5, further comprising:
a transceiver system, the transceiver system including:
one of the bidirectional equalizers;
a pulse generator operable to generate an undistorted broadband signal, which is input into a first port of the bidirectional equalizer; and
the respective dispersive antenna being operable to output a first distorted broadband signal to a second port of the bidirectional equalizer, operable to input a second distorted broadband signal from the second port of the bidirectional equalizer, and operable to radiate the undistorted broadband signal responsive to inputting the second distorted broadband signal from the second port of the bidirectional equalizer.

7. The system of claim 6, wherein the transceiver system is a first transceiver system and further comprising:
a second transceiver system, wherein the first transceiver system and the second transceiver system transmit and receive undistorted broadband signals to and from each other.

8. The system of claim 1, wherein a broadband signal of the broadband signals is an ultrawideband signal having shaped temporal pulses, and wherein the shapes of the temporal pulses in an undistorted broadband signal are undistorted.

9. The system of claim 1, wherein the dispersive antennae are electrically long antennae.

10. A method to maintain shapes of temporal pulses in wireless broadband signals transmitted through a dispersive antenna, the method comprising:
generating a broadband signal having the shapes of the temporal pulses;

distorting, by an equalizer, the broadband signal to compensate for distortion due to the dispersive antenna;
outputting the distorted broadband signal to the dispersive antenna; and
wirelessly radiating the broadband signal from the dispersive antenna, wherein the shapes of radiated temporal pulses are substantially similar to the shapes of the temporal pulses in the generated broadband signal.

11. The method of claim 10, wherein the dispersive antenna is a first dispersive antenna, and the equalizer is a first equalizer, the method further comprising:
receiving, by a second dispersive antenna, the broadband signal wirelessly radiated from the first dispersive antenna from the second antenna, wherein the received broadband signal is distorted by the second dispersive antenna and the distorted broadband signal is output from the second dispersive antenna to a second equalizer;
inverting the distortion of a broadband signal input to the second dispersive antenna, wherein the second equalizer compensates for distortion due to the second dispersive antenna; and
outputting the inversely distorted broadband signal to a receiver communicatively coupled to the second dispersive antenna via the second equalizer, wherein the shapes of the temporal pulses of the inversely distorted broadband signal received at the receiver are substantially the same as the shapes of the temporal pulses in the generated broadband signal.

12. The method of claim 11, wherein inverting the distortion of the broadband signal input to the second dispersive antenna comprises:
applying an algorithm to the broadband signal input to the second dispersive antenna to distort the broadband signal received at the second dispersive antenna by an inverse of the distortion due to the second dispersive antenna.

13. The method of claim 10, wherein distorting the broadband signal to compensate for distortion due to the dispersive antenna comprises:
applying an algorithm to the generated broadband signal to distort the generated broadband signal by an inverse of the distortion due to the dispersive antenna.

14. A system to improve the efficiency and receiver sensitivity of electrically long antennae in an ultrawideband wireless communication, the system comprising:
means for generating a broadband signal having shaped temporal pulses;
means for distorting the generated broadband signal before wireless transmission; and
means for radiating the broadband signal having the shaped temporal pulses from a dispersive transmitting antenna after inputting the distorted broadband signal at the dispersive transmitting antenna from the means for distorting.

15. The system of claim 14, the system further comprising:
means for receiving a wireless broadband signal having the shaped temporal pulses at a dispersive receiving antenna from the means for radiating the broadband signal;
means for distorting the broadband signal input from the dispersive receiving antenna; and
means for receiving the broadband signal having the shaped temporal pulses from the means for distorting the broadband signal input from the dispersive receiving antenna.

16. A non-transitory computer readable medium embodying a program of instructions executable by a computer to perform a method comprising:
   generating an undistorted broadband signal having shaped temporal pulses; and
   distorting the shape of the temporal pulses of the generated undistorted broadband signal by an inverse of a dispersion of a dispersive antenna at a first equalizer prior to radiating a broadband signal from the dispersive antenna, wherein the shape of the temporal pulses radiated from the dispersive antenna is substantially similar to the shape of the temporal pulses in the generated undistorted broadband signal.

17. The medium of claim 16, wherein the dispersive antenna is a transmitting dispersive antenna, wherein the broadband signal radiated from the transmitting dispersive antenna is received at a receiving dispersive antenna, and wherein the received broadband signal is distorted by the receiving dispersive antenna and a distorted broadband signal is output as shaped radiated temporal pulses from the receiving dispersive antenna to a second equalizer, the program of instructions executable by the computer to perform the method, further comprising:
   distorting the distorted broadband signal output as the shaped radiated temporal pulses from the receiving dispersive antenna by an inverse of a dispersion of the receiving dispersive antenna, wherein the shape of the temporal pulses received at a receiver associated with the receiving dispersive antenna via the second equalizer are substantially similar to the shape of the radiated temporal pulses radiated from the transmitting dispersive antenna.

* * * * *

UNITED STATES PATENT AND TRADEMARK OFFICE
CERTIFICATE OF CORRECTION

| | | |
|---|---|---|
| PATENT NO. | : 8,090,040 B2 | Page 1 of 1 |
| APPLICATION NO. | : 11/260336 | |
| DATED | : January 3, 2012 | |
| INVENTOR(S) | : Becker | |

It is certified that error appears in the above-identified patent and that said Letters Patent is hereby corrected as shown below:

At Claim 11, Column 10, Line 14, remove "from the second antenna"

Signed and Sealed this
Fifteenth Day of May, 2012

David J. Kappos
*Director of the United States Patent and Trademark Office*